US010558445B2

(12) United States Patent
Cillis et al.

(10) Patent No.: US 10,558,445 B2
(45) Date of Patent: Feb. 11, 2020

(54) CONSTRUCTING AND ENHANCING A DEPLOYMENT PATTERN

(71) Applicant: INTERNATIONAL BUSINESS MACHINES CORPORATION, Armonk, NY (US)

(72) Inventors: Canio Cillis, Berlin (DE); Jochen Kappel, Gross-Gerau (DE); Laurence J. Plant, North Balwyn (AU); Josef Reisinger, Bornheim (DE)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 15/376,802

(22) Filed: Dec. 13, 2016

(65) Prior Publication Data

US 2018/0165385 A1 Jun. 14, 2018

(51) Int. Cl.
*G06F 17/50* (2006.01)
*G06F 8/60* (2018.01)

(52) U.S. Cl.
CPC .................... *G06F 8/60* (2013.01)

(58) Field of Classification Search
CPC .................... G06F 8/36; G06F 8/60
USPC .......................................... 703/21
See application file for complete search history.

(56) References Cited

U.S. PATENT DOCUMENTS

| 8,010,938 | B2 | 8/2011 | Elaasar |  |
|---|---|---|---|---|
| 8,291,378 | B2* | 10/2012 | Arnold | G06F 8/61 |
|  |  |  |  | 717/104 |
| 8,417,658 | B2 | 4/2013 | Arnold et al. |  |
| 8,683,028 | B2* | 3/2014 | Davison | H04L 41/5041 |
|  |  |  |  | 709/217 |
| 8,745,577 | B2* | 6/2014 | Reech | G06F 16/185 |
|  |  |  |  | 717/104 |
| 8,751,620 | B2* | 6/2014 | Anderson | G06F 8/60 |
|  |  |  |  | 709/223 |
| 9,116,767 | B1* | 8/2015 | Arif | G06F 8/60 |
| 9,189,224 | B2* | 11/2015 | Ravi | G06F 8/65 |
| 9,264,315 | B2* | 2/2016 | Fukui | H04L 41/12 |
| 9,626,271 | B2* | 4/2017 | Karpuram | G06F 8/654 |

(Continued)

OTHER PUBLICATIONS

Eilam, Tamar et al.; Pattern-based composite application deployment; 12th IFIP/IEEE International Symposium on Integrated Network Management (IM 2011) and Workshops; May 23-27, 2011; pp. 217-224.

(Continued)

*Primary Examiner* — Eunhee Kim
(74) *Attorney, Agent, or Firm* — Schmeiser, Olsen & Watts; Mark C. Vallone

(57) ABSTRACT

An approach is provided for optimizing a deployment pattern. Event and configuration data of precedent systems is aggregated. Based on the aggregated data, a metadata model of the precedent systems is generated. Components of an initial deployment pattern of a new system are identified. Target non-functional requirements (NFRs) and target service levels of the new system are determined. Based on the metadata model, precedent system(s) that have components that match or are similar to the components in the initial deployment pattern are identified. A performance of the precedent system(s) is compared to the NFRs and target service levels. A new deployment pattern for the new system is generated. The new deployment pattern includes a modification of the components identified in the initial deployment pattern. A recommendation for deploying the new system using the new deployment pattern is generated.

22 Claims, 4 Drawing Sheets

(56) References Cited

U.S. PATENT DOCUMENTS

| | | | | |
|---|---|---|---|---|
| 9,686,150 | B2* | 6/2017 | Gesmann | H04L 41/5009 |
| 2010/0042659 | A1* | 2/2010 | Rose | G06F 8/36 |
| | | | | 717/174 |
| 2011/0099139 | A1* | 4/2011 | Coldicott | G06Q 10/06 |
| | | | | 706/47 |
| 2011/0296372 | A1* | 12/2011 | Bird | G06Q 30/06 |
| | | | | 717/102 |
| 2014/0068546 | A1* | 3/2014 | Balasubramanian | G06F 8/61 |
| | | | | 717/104 |
| 2015/0058459 | A1* | 2/2015 | Amendjian | H04L 41/5058 |
| | | | | 709/223 |
| 2016/0255095 | A1* | 9/2016 | Maes | G06F 17/30194 |
| | | | | 726/1 |

OTHER PUBLICATIONS

Arnold, William, et al.; Pattern Based SOA Deployment; Aug. 2007; retrieved from the Internet Mar. 4, 2016; URL: https://www.researchgate.net/publication/225227220_Pattern_based_SOA_deployment; 13 pages.

Breitenbucher, Uwe et al.; A Method to Automate Cloud Application Management Patterns; ADVCOMP 2014: the Eight International Conference on Advanced Engineering Computing and Applications in Sciences; Aug. 24-28, 2014; pp. 140-145.

IBM Software Group; Zoom Catalyst—Recover First, Resolve Next; Retrieved from the Internet Dec. 13, 2016; URL: http://www-01.ibm.com/common/ssi/cgi-bin/ssialias?subtype=WH&infotype=SA&htmlfid=MSL03007USEN&attachment=MSL03007USEN.PDF; 4 pages.

* cited by examiner

CONSTRUCTING AND ENHANCING A DEPLOYMENT PATTERN

BACKGROUND

The present invention relates to managing information technology (IT) and communication systems, and more particularly to constructing and optimizing deployment patterns.

Deployment patterns are metadata descriptions of IT and communications systems. Deployment patterns are used as instructions by cloud orchestration tools to automate the accurate construction of virtual IT and communications systems including compute, network, and storage systems. To construct a deployment pattern of good quality, a human pattern developer requires significant knowledge of (1) multiple classes of components in the system, including networks, security, directories, storage, applications, databases, and application servers; (2) the relationships among the aforementioned components; and (3) non-functional requirements (NFRs) and target service levels (e.g., target levels for availability and fluctuations in transaction throughput over time) and how to design infrastructure to achieve the NFRs and the target service levels. NFRs are requirements associated with characteristics of the system, including the security, availability, response time, throughput, and latency).

The known approaches to building deployment patterns have the following issues. Few people or teams have the skills to produce a deployment pattern of good quality. Issues with deployment patterns are identified when the system based on the pattern fails during a test phase or in production. A pattern developer can review documentation on precedent implementations to guide the deployment pattern design, but there is no guarantee that the documentation is accurate. Collecting data including metadata descriptions of the components in a system, relationships between the components, performance characteristics of the components, and service level achievement over time is labor-intensive. Because of the aforementioned issues, pattern developers manually build deployment patterns based on incomplete and possibly inaccurate information. A pattern developer can easily overlook key information such as performance data in log files that indicate issues with an existing system. The pattern developer may be replicating a bad design or copying a system that has failed to meet its target service levels.

Another issue with the known approaches to building deployment patterns includes a lack of an automated means of validating that a deployment pattern will meet desired service levels. For example, the pattern developer does not have an automated means to ensure that the deployment pattern will yield a system that has 99.99% availability or 500 millisecond latency. Many production systems achieve service levels by having excess infrastructure, such as more compute capacity or higher bandwidth network connections that is needed. This excess infrastructure means that ongoing infrastructure costs are higher than they need to be. For example, the pattern developer does not have an automated means for determining whether production resources are being used effectively and efficiently.

Yet another issue with the known approaches to building deployment patterns includes the need for a human to manually adjust the deployment pattern in response to the system being modified to meet a different target service level. For example, a deployment pattern that establishes a customer premise environment comprising security, teller machines, and voice services will need less network and compute capacity for a small rural office and greater capacity at a regional center. The pattern developer must manually adjust each deployment pattern to suit the different offices. The required manual adjustment takes a significant amount of labor and is error-prone.

Accordingly, there is a need for a technique that automatically constructs and enhances a deployment pattern at a design phase that precedes any test or production phase, where the deployment pattern is based on complete and accurate information from existing systems, where the information specifies the components in the existing systems, interrelationships between the components, performance characteristics of the components, and service level achievement in the existing systems over time.

SUMMARY

In one embodiment, the present invention provides a method of optimizing a deployment pattern. The method includes a computer aggregating event data from a plurality of precedent systems and configuration data specifying infrastructure in the plurality of precedent systems. The method further includes based on the aggregated event data and configuration data, the computer generating a metadata model of the precedent systems. The method further includes the computer identifying components in an initial deployment pattern of a new system. The method further includes the computer determining target non-functional requirements (NFRs) and target service levels of the new system by receiving user-specified target NFRs and user-specified target service levels or automatically identifying the target NFRs and the target service levels of the new system based on the initial deployment pattern. The method further includes based on the metadata model, the computer identifying one or more precedent systems included in the plurality of precedent systems that have components that match or are similar to the components in the initial deployment pattern. The method further includes based on the metadata model, the computer comparing a performance of the one or more precedent systems to the target NFRs and target service levels of the new system. The method further includes in response to the step of comparing, the computer generating a new deployment pattern for the new system. The new deployment pattern includes a modification of the components that were identified in the initial deployment pattern. The method further includes the computer generating a recommendation for deploying the new system using the new deployment pattern.

The aforementioned embodiment provides an automated deployment pattern optimization that advantageously (1) provides an automated discovery and enhancement of new deployment patterns during a design phase which is prior to any test or run phase; (2) avoids the need for a person or a team of people to have the skills needed to manually construct a high quality deployment pattern that will satisfy NFRs and meet target service levels, and (3) avoids a time-consuming, manual collection of data about precedent systems. The aforementioned embodiment also advantageously provides accurate and complete metadata descriptions of components in precedent systems, relationships between the components, performance characteristics of the components, and service level achievement of the precedent systems over time. The aforementioned embodiment also provides automated means for validating that a deployment pattern will meet desired service levels and automated means for adjusting a deployment pattern when the system is to be modified to meet different service levels.

The advantages discussed above also apply to the computer system and computer program product embodiments, which are summarized below.

In one optional aspect of the present invention, the method further includes the computer deploying an instance of the new system using the new deployment pattern. The method may further include the computer iteratively testing and improving the performance of the deployed instance of the new system. The method may further include based on the tested and improved performance of the deployed instance of the new system, the computer validating the new deployment pattern. The aforementioned aspect advantageously provides an automated approach to validating a deployment pattern which ensures that production resources of the new system will be used efficiently and effectively, which avoids known manual validation approaches which are error-prone and costly in terms of required labor.

In another optional aspect of the present invention, the method further includes the computer determining that a performance of the new system does not attain a target service level included in the target service levels. The method may further include based on the performance of the new system not attaining the target service level, the computer modifying the new deployment pattern. The method may further include the computer updating the new system based on the modified new deployment pattern. The method may further include the computer determining that the updated new system based on the modified new deployment pattern attains the target service level. The aforementioned aspect of the present invention advantageously provides an automated approach to adjusting a deployment pattern to satisfy different service levels, which avoids the known manual adjustment approaches which are error-prone and costly in terms of required labor.

In another embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of optimizing a deployment pattern. The method includes a computer system aggregating event data from a plurality of precedent systems and configuration data specifying infrastructure in the plurality of precedent systems. The method further includes based on the aggregated event data and configuration data, the computer system generating a metadata model of the precedent systems. The method further includes the computer system identifying components in an initial deployment pattern of a new system. The method further includes the computer system determining target non-functional requirements (NFRs) and target service levels of the new system by receiving user-specified target NFRs and user-specified target service levels or automatically identifying the target NFRs and the target service levels of the new system based on the initial deployment pattern. The method further includes based on the metadata model, the computer system identifying one or more precedent systems included in the plurality of precedent systems that have components that match or are similar to the components in the initial deployment pattern. The method further includes based on the metadata model, the computer system comparing a performance of the one or more precedent systems to the target NFRs and target service levels of the new system. The method further includes in response to the step of comparing, the computer system generating a new deployment pattern for the new system. The new deployment pattern includes a modification of the components that were identified in the initial deployment pattern. The method further includes the computer system generating a recommendation for deploying the new system using the new deployment pattern.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of optimizing a deployment pattern. The method includes a computer system aggregating event data from a plurality of precedent systems and configuration data specifying infrastructure in the plurality of precedent systems. The method further includes based on the aggregated event data and configuration data, the computer system generating a metadata model of the precedent systems. The method further includes the computer system identifying components in an initial deployment pattern of a new system. The method further includes the computer system determining target non-functional requirements (NFRs) and target service levels of the new system by receiving user-specified target NFRs and user-specified target service levels or automatically identifying the target NFRs and the target service levels of the new system based on the initial deployment pattern. The method further includes based on the metadata model, the computer system identifying one or more precedent systems included in the plurality of precedent systems that have components that match or are similar to the components in the initial deployment pattern. The method further includes based on the metadata model, the computer system comparing a performance of the one or more precedent systems to the target NFRs and target service levels of the new system. The method further includes in response to the step of comparing, the computer system generating a new deployment pattern for the new system. The new deployment pattern includes a modification of the components that were identified in the initial deployment pattern. The method further includes the computer system generating a recommendation for deploying the new system using the new deployment pattern.

DETAILED DESCRIPTION

Overview

Figure 1:
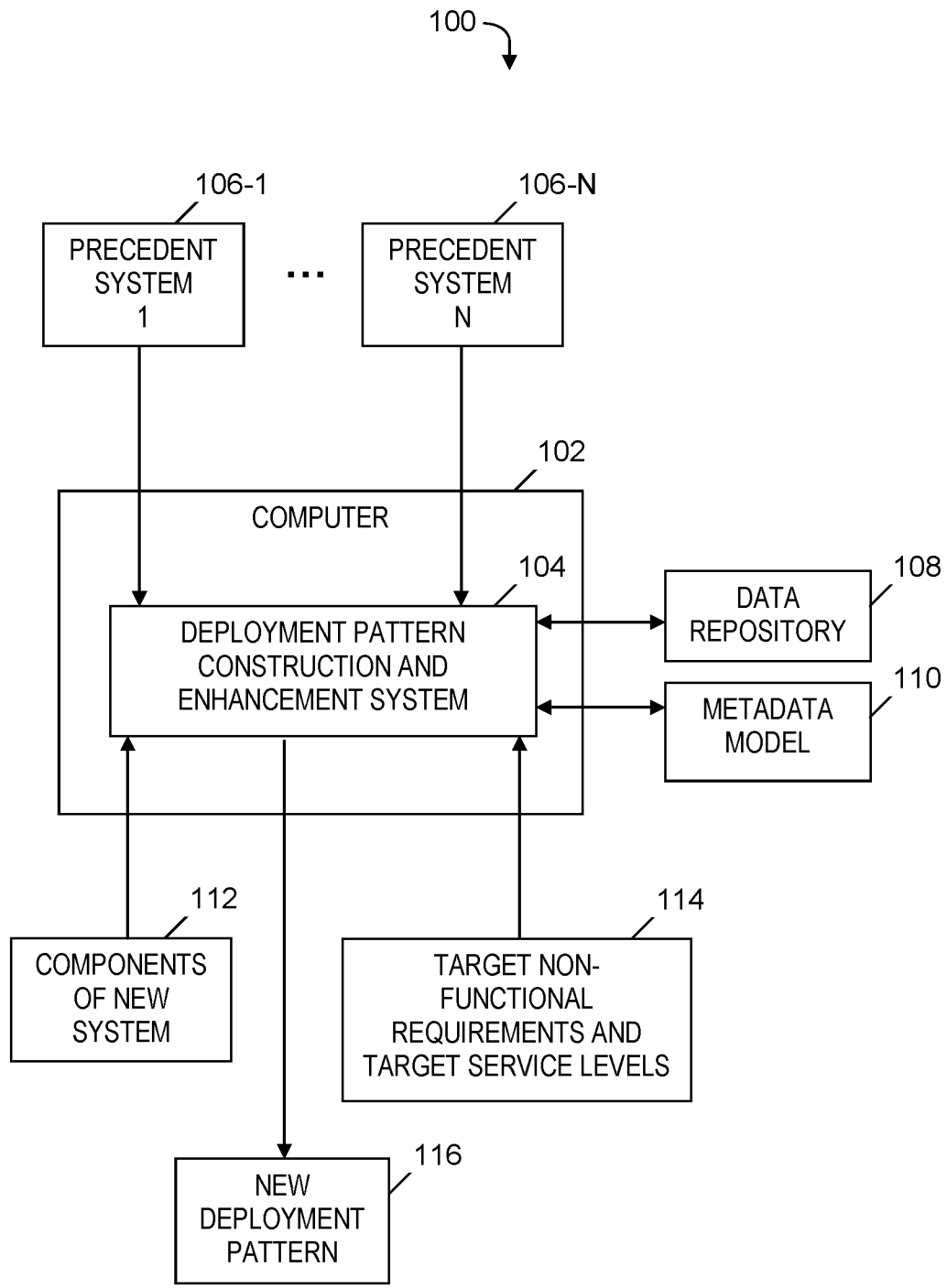
FIG. 1 is a block diagram of a system for constructing and enhancing a deployment pattern, in accordance with embodiments of the present invention.

Embodiments of the present invention automatically discover and validate new patterns by (1) aggregating data from existing systems (i.e., precedent systems), including physical and virtual infrastructure, and storing the aggregated data to form a repository of precedents; (2) analyzing the data in the repository to construct a metadata model of the existing systems; and (3) provide automated tools for a pattern developer to (i) identify components in the design of a new system, (ii) specify the target service levels and NFRs of the new system, (iii) identify relevant precedent system implementations and precedent patterns, (iv) generate a new deployment pattern for the new system based on the specified target service levels and NFRs, where the new deployment pattern is generated during a design phase and prior to any test or production phase, (v) model the performance of the new system, (vi) vary the target service levels and NFRs to compare the costs of different options (e.g., confirm the cost of achieving a higher level of availability in the new system), (vii) validate the new deployment pattern over time as the resulting new system passes through a test phase and enters a production phase, and (viii) monitoring the new system to determine how the new deployment pattern can be enhanced.

Known approaches to designing and deploying IT and communications systems using deployment patterns allow quick design and deployment of a system, but without guaranteeing that the system will perform well and without ensuring that the system will include attributes specified in NFRs. A pattern developer manually building a deployment pattern by a known approach may not have access to complete and accurate information about existing systems, and therefore may fail to consider key information such as performance data in log files that indicate issues with an existing system. Furthermore, the pattern developer using a known approach with incomplete and/or inaccurate information about existing systems may construct a deployment pattern by simply replicating a deficient design or copying a system that has failed to meet its target service levels. Embodiments of the present invention overcome the aforementioned deficiencies of the known approaches using deployment patterns by advantageously ensuring a quick design and deployment of an IT system or communications system while also ensuring a performance of the system that meets target service levels and provides desired NFRs.

In a traditional infrastructure lifecycle that includes the sequence of design, build, and run phases, there are multiple iterations that include automatic monitoring and assessing of the physical and virtual infrastructure, followed by a dynamic reconfiguration of the infrastructure to improve the infrastructure at runtime. The multiple iterations in the traditional approaches are costly and time-consuming. Embodiments of the present invention construct and enhance, at the design phase, a deployment pattern whose quality is ensured by target service levels and NFRs of the infrastructure being built being likely to be satisfied based on historical performance data of precedent system(s) whose infrastructure is the same or similar to the infrastructure being built. Because the initial deployment pattern constructed and enhanced by embodiments of the present invention is validated to be of high quality, the number of iterations (and the associated time and cost) of monitoring, assessment, and redesign is minimized.

System for Constructing and Enhancing a Deployment Pattern

FIG. 1 is a block diagram of a system 100 for constructing and enhancing a deployment pattern, in accordance with embodiments of the present invention. System 100 includes a computer 102, which executes a software-based deployment pattern construction and enhancement system 104. Precedent system 106-1, . . . , precedent system 106-N are N computer systems in communication with computer 102 via a computer network (not shown), where N is an integer greater than or equal to one. Each of precedent systems 106-1, . . . , 106-N sends its event data and infrastructure configuration data to deployment pattern construction and enhancement system 104, which stores the sent data in a data repository 108.

Deployment pattern construction and enhancement system 104 generates a metadata model 110 by using the event data and infrastructure configuration data stored in data repository 108.

To construct a new system (i.e., a new IT system or a new communications system), deployment pattern construction and enhancement system 104 receives identifications and attributes of components 112 of the new system and target NFRs and target service levels 114 of the new system. Based on metadata model 110, components 112, and target NFRs and target service levels 114 deployment pattern construction and enhancement system 104 generates a new deployment pattern 116 which is a metadata description of the new system. In one embodiment, after new deployment pattern 116 is validated through a process of testing and improving the new system, an orchestration tool (not shown) instantiates the new deployment pattern 116 as a full virtual system (not shown).

Figure 2:
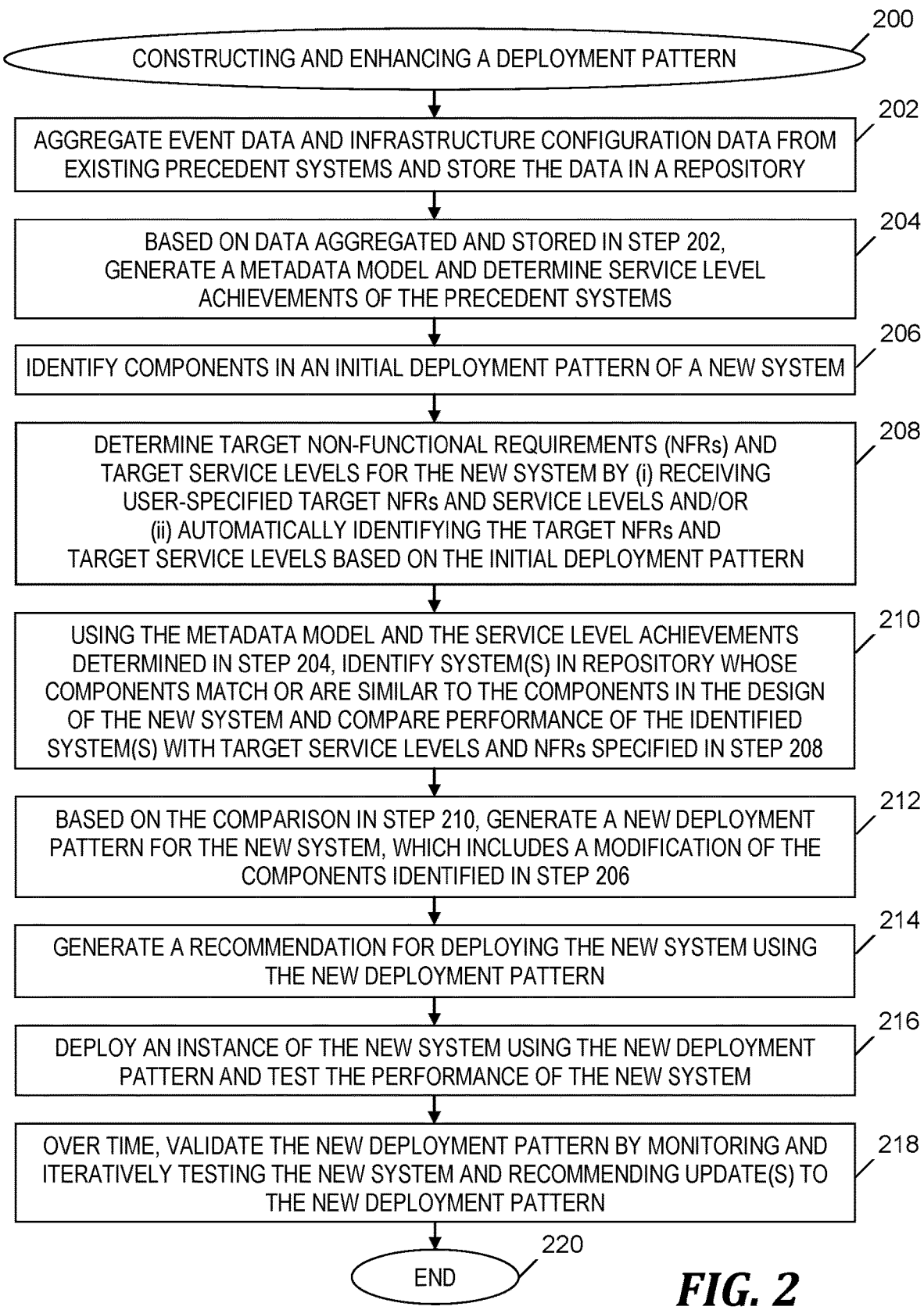
FIG. 2 is a flowchart of a process of constructing and enhancing a deployment pattern, where the process is implemented in the system of FIG. 1, in accordance with embodiments of the present invention.
Figure 4:
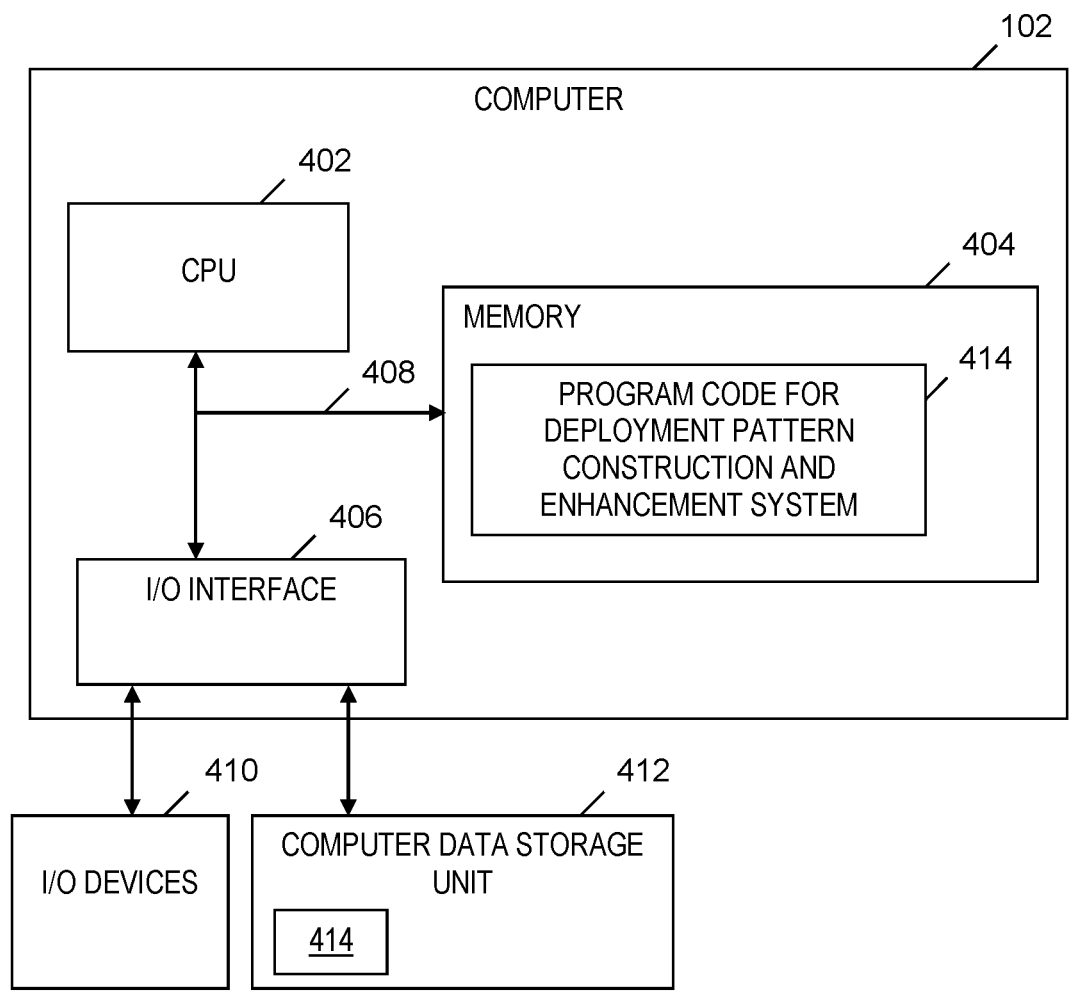
FIG. 4 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2 and FIG. 4 presented below.

Process for Constructing and Enhancing a Deployment Pattern

FIG. 2 is a flowchart of a process of constructing and enhancing a deployment pattern, where the process is implemented in the system of FIG. 1, in accordance with embodiments of the present invention. The process of FIG. 2 begins at step 200. In step 202, deployment pattern construction and enhancement system 104 (see FIG. 1) aggregates event data and infrastructure configuration data from existing precedent systems 106-1, . . . , 106-N (see FIG. 1) (i.e., production systems) and stores the aggregated data in data repository 108 (see FIG. 1). In one embodiment, the data aggregated and stored in step 202 includes a metadata description of components of precedent systems 106-1, . . . , 106-N (see FIG. 1), relationships between the components, performance characteristics of precedent systems 106-1, . . . , 106-N (see FIG. 1), and overall service level achievements of precedent systems 106-1, . . . , 106-N (see FIG. 1).

In step 204, based on the data aggregated and stored in step 202, deployment pattern construction and enhancement system 104 (see FIG. 1) generates metadata model 110 (see FIG. 1) and determines service level achievements of precedent systems 106-1, . . . , 106-N (see FIG. 1).

In step 206, deployment pattern construction and enhancement system 104 (see FIG. 1) identifies components 112 (see FIG. 1) in a design of infrastructure for a new system (i.e., an initial deployment pattern).

In step 208, deployment pattern construction and enhancement system 104 (see FIG. 1) determines target NFRs and target service levels 114 (see FIG. 1) for the new system by (1) receiving user-specified target NFRs and user-specified target service levels 114 (see FIG. 1) and/or (2) automatically identifying the target NFRs and target service levels 114 (see FIG. 1) for the new system based on the initial deployment pattern. If step 208 includes receiving the user-specified target NFRs and the user-specified target service levels 114 (see FIG. 1), then prior to step 208, deployment pattern construction and enhancement system 104 (see FIG. 1) receives the user-specified target NFRs and the user-specified target service levels 114 (see FIG. 1) from one or more users via respective one or more computing devices (not shown). The one or more users may specify the target NFRs and the target service levels 114 (see FIG. 1) and use the one or more computing devices (not shown) to send the target NFRs and target service levels 114 (see FIG. 1) to deployment pattern construction and enhancement system 104 (see FIG. 1) prior to step 208. In one embodiment, prior to step 208, deployment pattern construction and enhancement system 104 (see FIG. 1) receives a user selection from a computing device (not shown) which indicates whether the target NFRs and target service levels 114 (see FIG. 1) consist of (i) user-specified target NFRs and user-specified target service levels, (ii) automatically identified target NFRs and automatically identified target service levels, or (iii) a combination of user-specified target NFRs, user-specified target service levels, automatically identified target NFRs, and automatically identified target service levels, and subsequently, step 208 is performed based on the aforementioned user selection.

In step 210, using metadata model 110 (see FIG. 1) and the service level achievements determined in step 204, deployment pattern construction and enhancement system 104 (see FIG. 1) identifies relevant precedent system(s) included in precedent systems 106-1, . . . , 106-N (see FIG. 1), where the components of the relevant system(s) match or are similar to components 112 (see FIG. 1) in the design of the new system. Deployment pattern construction and enhancement system 104 (see FIG. 1) also retrieves from data repository 108 (see FIG. 1) the deployment patterns of the relevant precedent system(s). Step 210 also includes deployment pattern construction and enhancement system 104 (see FIG. 1) comparing the performance of the identified one or more relevant precedent systems included in precedent systems 106-1, . . . , 106-N (see FIG. 1) to NFRs and target service levels 114 (see FIG. 1), which were specified in step 208.

In step 212, based on the comparison of the identified precedent system(s) to the NFRs and target service levels 114 (see FIG. 1), deployment pattern construction and enhancement system 104 (see FIG. 1) generates new deployment pattern 116 (see FIG. 1) for the new system. New deployment pattern 116 (see FIG. 1) includes a modification of components 112 (see FIG. 1), which were identified in step 206.

In step 214, deployment pattern construction and enhancement system 104 (see FIG. 1) generates a recommendation for deploying the new system using new deployment pattern 116 (see FIG. 1). Steps 206 through 214 are performed during a design phase of a lifecycle of the infrastructure of the new system, where the design phase precedes any build or run phase in the lifecycle.

In step 216, deployment pattern construction and enhancement system 104 (see FIG. 1) deploys an instance of the new system using new deployment pattern 116 (see FIG. 1). Step 216 also includes deployment pattern construction and enhancement system 104 (see FIG. 1) testing the performance of the new system.

In step 218, over time, deployment pattern construction and enhancement system 104 (see FIG. 1) validates new deployment pattern 116 (see FIG. 1) by monitoring the performance of the new system, iteratively testing the new system, and recommending update(s) to new deployment pattern 116 (see FIG. 1). Deployment pattern construction and enhancement system 104 (see FIG. 1) may implement the recommended update(s), which results in an improvement in the performance of the deployed instance of the new system. Based on the improved performance, deployment pattern construction and enhancement system 104 (see FIG. 1) validates new deployment pattern 116 (see FIG. 1). Step 218 advantageously provides an automated means for validating new deployment pattern 116 (see FIG. 1) which ensures that NFRs and target service levels 114 (see FIG. 1) are achieved at runtime with an effective use of production resources.

The process of FIG. 2 ends at step 220.

In one embodiment, after step 212, deployment pattern construction and enhancement system 104 (see FIG. 1) determines that another new deployment pattern is needed to be constructed for another new system which has NFRs and/or target service levels that differ from NFRs and target service levels 114 (see FIG. 1). Deployment pattern construction and enhancement system 104 (see FIG. 1) automatically adjusts new deployment pattern 116 (see FIG. 1) to construct the other new deployment pattern which satisfies the other NFRs and target service levels. This automatic adjustment takes a proven deployment pattern harvested from one environment and repurposes it to vary the infrastructure being deployed based on the different NFRs and/or target service levels (e.g., a greater volume of transactions). For example, deployment pattern construction and enhancement system 104 (see FIG. 1) adjusts a deployment pattern for deploying customer premise equipment into a head office by automatically scaling the deployment pattern down in terms of compute and network capacity for a regional center whose volume of transactions is significantly less than the volume of transactions at the head office. This automatic adjustment by deployment pattern construction and enhancement system 104 (see FIG. 1) advantageously avoids the time-consuming and error-prone manual adjustment of known deployment pattern approaches.

In one embodiment, deployment pattern construction and enhancement system 104 (see FIG. 1) varies the NFRs and target service levels 114 (see FIG. 1) to compare the cost of different options for the new system (e.g., to confirm the cost of achieving a higher level of availability in the new system).

EXAMPLE

Figure 3:
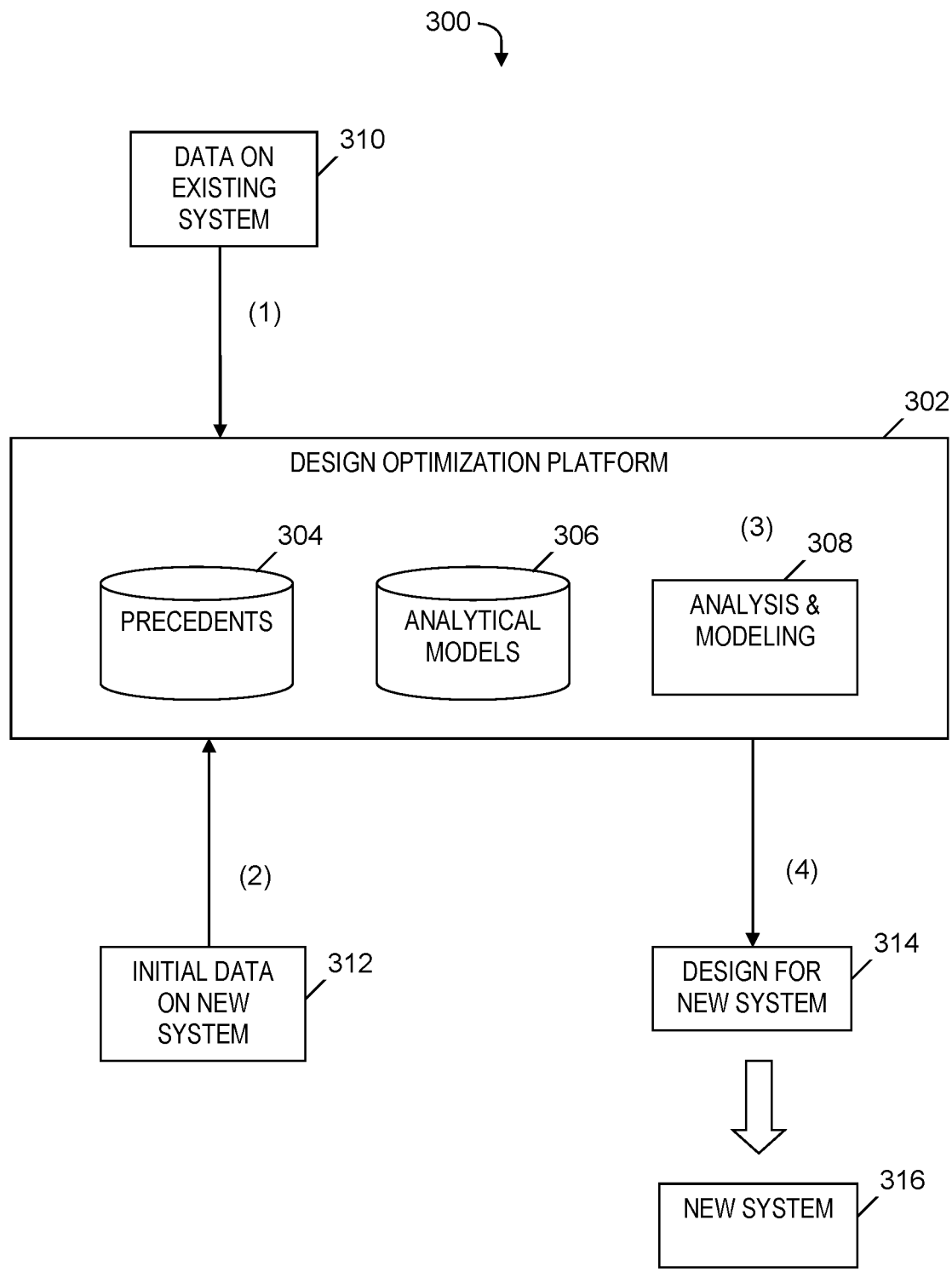
FIG. 3 is an example of constructing and enhancing a deployment pattern utilizing the system of FIG. 1 and the process of FIG. 2, in accordance with embodiments of the present invention.

FIG. 3 is an example 300 of constructing and enhancing a deployment pattern utilizing the system of FIG. 1 and the process of FIG. 2, in accordance with embodiments of the present invention. In example 300, a design optimization platform 302 includes precedents 304 (i.e., a data repository of data about precedent systems 106-1, . . . , 106-N (see FIG. 1)), analytical models 306, and an analysis and modeling system 308. Design optimization platform 302 is included in deployment pattern construction and enhancement system 104 (see FIG. 1). Precedents 304 is stored in data repository 108 (see FIG. 1). Analytical models 306 are stored in metadata model 110 (see FIG. 1).

In step (1) in example 300, data on existing system 310 is loaded into design optimization platform 302 on an ongoing basis. The data being loaded includes NFRs, deployment patterns, and key performance indicators that specify an existing system included in precedent systems 106-1, ..., 106-N (see FIG. 1).

In step (2) in example 300, deployment pattern construction and enhancement system 104 (see FIG. 1) prepares an initial design for a new system. Data (i.e., initial data on new system 312) including a deployment pattern for the new system and NFRs 114 (see FIG. 1) are loaded into design optimization platform 302 in step (2).

In step (3), design optimization platform 302 undertakes analysis of the initial design (i.e., initial deployment pattern) of the new system compared to data in precedents 304 and analytical models 306 to identify issues with the new system. For example, design optimization platform 302 determines that the new system has 99% availability and will not reach the target of 99.99% availability. Step (3) also includes design optimization platform 302 making improvements to the design of the new system to ensure that the new system meets NFRs. Step (3) also includes design optimization platform 302 modeling variations of the design of the new system to determine efficient and effective uses of production resources while meeting various NFRs and target service levels. For example, design optimization platform 302 models variations in the design of the new system to identify how the number of servers can be decreased if the availability target is relaxed.

In step (4) of example 300, design optimization platform 302 exports the improved design for the new system 314, which is used to construct a new system 316 in a cloud environment.

Computer System

FIG. 4 is a block diagram of a computer 102 that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for deployment pattern construction and enhancement system 104 (see FIG. 1) to perform a method of constructing and enhancing a deployment pattern, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to construct and enhance a deployment pattern. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may store components of new system 112 (see FIG. 1) and NFRs and target service levels 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to constructing and enhancing a deployment pattern. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to construct and enhance a deployment pattern. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of constructing and enhancing a deployment pattern.

While it is understood that program code 414 for constructing and enhancing a deployment pattern may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of constructing and enhancing a deployment pattern. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimizing a deployment pattern, the method comprising the steps of:
    a computer aggregating a metadata description of components in plurality of precedent systems, relationships between the components, performance characteristics of the plurality of precedent systems, and overall service level achievements of the plurality of precedent systems;
    based on the metadata description of the components, the relationships between the components, the performance characteristics of the plurality of precedent systems, and the overall service level achievements of the plurality of precedent systems, the computer generating a metadata model of the precedent systems;
    during a design phase of a lifecycle of an infrastructure of a new system and prior to any test phase or production phase of the new system, the computer identifying components in an initial deployment pattern of the new system, the initial deployment pattern being an initial design of the infrastructure of the new system;
    during the design phase of the lifecycle of the infrastructure of the new system and prior to any test phase or production phase of the new system, the computer determining target non-functional requirements (NFRs) and target service levels of the new system by automatically identifying the target NFRs and the target service levels of the new system based on the initial deployment pattern;
    during the design phase of the lifecycle of the infrastructure of the new system and prior to any test phase or production phase of the new system, and based on the metadata model and the overall service level achievements of the plurality of precedent systems, the computer identifying one or more precedent systems included in the plurality of precedent systems that have components that match the components in the initial deployment pattern;
    during the design phase of the lifecycle of the infrastructure of the new system and prior to any test phase or production phase of the new system, and based on the metadata model, the computer determining that a historical performance of the one or more precedent systems did not satisfy the target NFRs and the target service levels of the new system;
    during the design phase of the lifecycle of the infrastructure of the new system and prior to any test phase or production phase of the new system, and in response to the step of determining that the historical performance of the one or more precedent systems did not satisfy the target NFRs and the target service levels, the computer modifying the components that were identified in the initial deployment pattern and generating a new deployment pattern for the new system so that (i) the new deployment pattern includes the modified components and (ii) a performance of the new system using the new deployment pattern is likely to satisfy the target NFRs and the target service levels; and
    during the design phase of the lifecycle of the infrastructure of the new system and prior to any test phase or production phase of the new system, the computer generating a recommendation for deploying the new system using the new deployment pattern.

2. The method of claim 1, further comprising the steps of:
    the computer deploying an instance of the new system using the new deployment pattern;
    the computer iteratively testing and improving a performance of the deployed instance of the new system; and
    based on the tested and improved performance of the deployed instance of the new system, the computer validating the new deployment pattern.

3. The method of claim 1, further comprising the steps of:
    the computer determining an initial cost of the new system based on the target NFRs and target service levels;
    the computer modifying the target NFRs and the target service levels; and
    based on the modified target NFRs and the modified target service levels, the computer determining an updated cost of the new system.

4. The method of claim 1, further comprising the steps of:
    the computer determining that the performance of the new system does not attain a target service level included in the target service levels;
    based on the performance of the new system not attaining the target service level, the computer modifying the new deployment pattern;
    the computer updating the new system based on the modified new deployment pattern; and
    the computer determining that the updated new system based on the modified new deployment pattern attains the target service level.

5. The method of claim 1, wherein the step of aggregating includes the steps of:
    receiving data in logs generated by an infrastructure in the plurality of precedent systems; and
    receiving data from application discovery tools, dependency tools, and network configuration discovery tools.

6. The method of claim 1, further comprising the steps of:
identifying entities in an infrastructure in the plurality of precedent systems, the identified entities being included in predefined key entities;
identifying relationships among the identified entities;
mapping the identified entities to respective node patterns, each node pattern storing attributes of a corresponding entity included in the identified entities; and
generating link patterns specifying the identified relationships among the identified entities.

7. The method of claim 6, wherein the step of generating the new deployment pattern includes the step of aggregating the node patterns and the link patterns.

8. The method of claim 1, further comprising the step of:
providing at least one support service for at least one of creating, integrating, hosting, maintaining, and deploying computer-readable program code in the computer, the program code being executed by a processor of the computer to implement the steps of aggregating the metadata description of the components in the plurality of precedent systems, the relationships between the components, the performance characteristics of the plurality of precedent systems, and the overall service level achievements of the plurality of precedent systems, generating the metadata model, identifying the components in the initial deployment pattern, determining the target NFRs and the target service levels, identifying the one or more precedent systems, determining that the historical performance of the one or more precedent systems did not satisfy the target NFRs and the target service levels, modifying the components that were identified in the initial deployment pattern, generating the new deployment pattern, and generating the recommendation.

9. A computer program product, comprising:
a computer-readable storage medium; and
a computer-readable program code stored in the computer-readable storage medium, the computer-readable program code containing instructions that are executed by a central processing unit (CPU) of a computer system to implement a method of optimizing a deployment pattern, the method comprising the steps of:
the computer system aggregating a metadata description of components in a plurality of precedent systems, relationships between the components, performance characteristics of the plurality of precedent systems, and overall service level achievements of the plurality of precedent systems;
based on the metadata description of the components, the relationships between the components, the performance characteristics of the plurality of precedent systems, and the overall service level achievements of the plurality of precedent systems, the computer system generating a metadata model of the precedent systems;
during a design phase of a lifecycle of an infrastructure of a new system and prior to any test phase or production phase of the new system, the computer system identifying components in an initial deployment pattern of the new system, the initial deployment pattern being an initial design of the infrastructure of the new system;
during the design phase of the lifecycle of the infrastructure of the new system and prior to any test phase or production phase of the new system, the computer system determining target non-functional requirements (NFRs) and target service levels of the new system by automatically identifying the target NFRs and the target service levels of the new system based on the initial deployment pattern;
during the design phase of the lifecycle of the infrastructure of the new system and prior to any test phase or production phase of the new system, and based on the metadata model and the overall service level achievements of the plurality of precedent systems, the computer system identifying one or more precedent systems included in the plurality of precedent systems that have components that match the components in the initial deployment pattern;
during the design phase of the lifecycle of the infrastructure of the new system and prior to any test phase or production phase of the new system, and based on the metadata model, the computer system determining that a historical performance of the one or more precedent systems did not satisfy the target NFRs and the target service levels of the new system;
during the design phase of the lifecycle of the infrastructure of the new system and prior to any test phase or production phase of the new system, and in response to the step of determining that the historical performance of the one or more precedent systems did not satisfy the target NFRs and the target service levels, the computer system modifying the components that were identified in the initial deployment pattern and generating a new deployment pattern for the new system so that (i) the new deployment pattern includes the modified components and (ii) a performance of the new system using the new deployment pattern is likely to satisfy the target NFRs and the target service levels; and
during the design phase of the lifecycle of the infrastructure of the new system and prior to any test phase or production phase of the new system, the computer system generating a recommendation for deploying the new system using the new deployment pattern.

10. The computer program product of claim 9, wherein the method further comprises the steps of:
the computer system deploying an instance of the new system using the new deployment pattern;
the computer system iteratively testing and improving a performance of the deployed instance of the new system; and
based on the tested and improved performance of the deployed instance of the new system, the computer system validating the new deployment pattern.

11. The computer program product of claim 9, wherein the method further comprises the steps of:
the computer system determining an initial cost of the new system based on the target NFRs and the target service levels;
the computer system modifying the target NFRs and the target service levels; and
based on the modified target NFRs and the modified target service levels, the computer system determining an updated cost of the new system.

12. The computer program product of claim 9, wherein the method further comprises the steps of:
the computer system determining that the performance of the new system does not attain a target service level included in the target service levels;
based on the performance of the new system not attaining the target service level, the computer system modifying the new deployment pattern;

the computer system updating the new system based on the modified new deployment pattern; and the computer system determining that the updated new system based on the modified new deployment pattern attains the target service level.

13. The computer program product of claim 9, wherein the step of aggregating includes the steps of:

receiving data in logs generated by an infrastructure in the plurality of precedent systems; and receiving data from application discovery tools, dependency tools, and network configuration discovery tools.

14. The computer program product of claim 9, wherein the method further comprises the steps of:

identifying entities in an infrastructure in the plurality of precedent systems, the identified entities being included in predefined key entities;

identifying relationships among the identified entities;

mapping the identified entities to respective node patterns, each node pattern storing attributes of a corresponding entity included in the identified entities; and generating link patterns specifying the identified relationships among the identified entities.

15. The computer program product of claim 14, wherein the step of generating the new deployment pattern includes the step of aggregating the node patterns and the link patterns.

16. A computer system comprising:

a central processing unit (CPU);

a memory coupled to the CPU; and a computer readable storage device coupled to the CPU, the storage device containing instructions that are executed by the CPU via the memory to implement a method of optimizing a deployment pattern, the method comprising the steps of:

the computer system aggregating a metadata description of components in a plurality of precedent systems, relationships between the components, performance characteristics of the plurality of precedent systems, and overall service level achievements of the plurality of precedent systems;

based on the metadata description of the components, the relationships between the components, the performance characteristics of the plurality of precedent systems, and the overall service level achievements of the plurality of precedent systems, the computer system generating a metadata model of the precedent systems;

during a design phase of a lifecycle of an infrastructure of a new system and prior to any test phase or production phase of the new system, the computer system identifying components in an initial deployment pattern of the new system, the initial deployment pattern being an initial design of the infrastructure of the new system;

during the design phase of the lifecycle of the infrastructure of the new system and prior to any test phase or production phase of the new system, the computer system determining target non-functional requirements (NFRs) and target service levels of the new system by automatically identifying the target NFRs and the target service levels of the new system based on the initial deployment pattern;

during the design phase of the lifecycle of the infrastructure of the new system and prior to any test phase or production phase of the new system, and based on the metadata model and the overall service level achievements of the plurality of precedent systems, the computer system identifying one or more precedent systems included in the plurality of precedent systems that have components that match the components in the initial deployment pattern;

during the design phase of the lifecycle of the infrastructure of the new system and prior to any test phase or production phase of the new system, and based on the metadata model, the computer system determining that a historical performance of the one or more precedent systems did not satisfy the target NFRs and the target service levels of the new system;

during the design phase of the lifecycle of the infrastructure of the new system and prior to any test phase or production phase of the new system, and in response to the step of determining that the historical performance of the one or more precedent systems did not satisfy the target NFRs and the target service levels, the computer system modifying the components that were identified in the initial deployment pattern and generating a new deployment pattern for the new system so that (i) the new deployment pattern includes the modified components and (ii) a performance of the new system using the new deployment pattern is likely to satisfy the target NFRs and the target service levels; and during the design phase of the lifecycle of the infrastructure of the new system and prior to any test phase or production phase of the new system, the computer system generating a recommendation for deploying the new system using the new deployment pattern.

17. The computer system of claim 16, wherein the method further comprises the steps of:

the computer system deploying an instance of the new system using the new deployment pattern;

the computer system iteratively testing and improving a performance of the deployed instance of the new system; and based on the tested and improved performance of the deployed instance of the new system, the computer system validating the new deployment pattern.

18. The computer system of claim 16, wherein the method further comprises the steps of:

the computer system determining an initial cost of the new system based on the target NFRs and the target service levels;

the computer system modifying the target NFRs and the target service levels; and based on the modified target NFRs and the modified target service levels, the computer system determining an updated cost of the new system.

19. The computer system of claim 16, wherein the method further comprises the steps of:

the computer system determining that the performance of the new system does not attain a target service level included in the target service levels;

based on the performance of the new system not attaining the target service level, the computer system modifying the new deployment pattern;

the computer system updating the new system based on the modified new deployment pattern; and the computer system determining that the updated new system based on the modified new deployment pattern attains the target service level.

20. The computer system of claim 16, wherein the step of aggregating includes the steps of:

receiving data in logs generated by an infrastructure in the plurality of precedent systems; and receiving data from application discovery tools, dependency tools, and network configuration discovery tools.

21. The computer system of claim 16, wherein the method further comprises the steps of:

identifying entities in an infrastructure in the plurality of precedent systems, the identified entities being included in predefined key entities;

identifying relationships among the identified entities;

mapping the identified entities to respective node patterns, each node pattern storing attributes of a corresponding entity included in the identified entities; and generating link patterns specifying the identified relationships among the identified entities.

22. The computer system of claim 21, wherein the step of generating the new deployment pattern includes the step of aggregating the node patterns and the link patterns.

* * * * *